July 26, 1949.  C. E. BANNISTER  2,477,436
FLUID-CONDUCTING AND PRESSURE-CUSHIONING DEVICE
Filed April 30, 1945
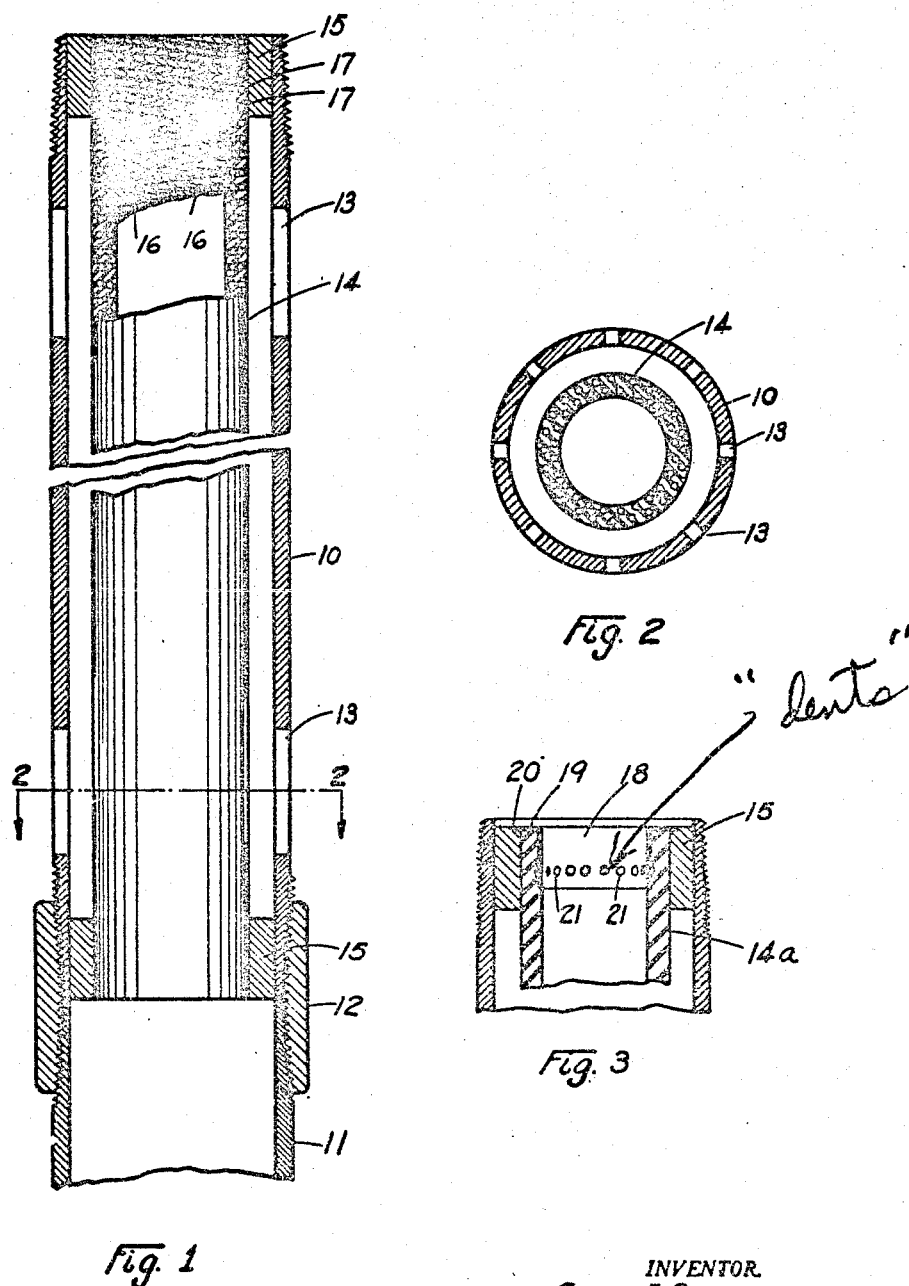
INVENTOR.
CLYDE E. BANNISTER
BY
Willard D. Eakin
ATTORNEY Patented July 26, 1949

2,477,436

UNITED STATES PATENT OFFICE 2,477,436

FLUID-CONDUCTING AND PRESSURE-CUSHIONING DEVICE

Clyde E. Bannister, Houston, Tex.

Application April 30, 1945, Serial No. 591,178

3 Claims. (Cl. 138—28)

This invention relates to fluid-conducting and pressure-cushioning devices, suitable for the suspension therefrom of a fluid-actuated motor or the like, as in the drilling of oil or other wells.

Its chief object is to provide for lowering and raising the motor-and-drill-bit assembly or the like on a relatively rigid "string" comprising fluid-conducting pipe sections and at the same time provide for so cushioning variations of pressure in the motive fluid incident to valve-closing as to avoid harmful effects of "water-hammer."

A further object is to provide a simple and inexpensive device for that purpose.

Of the accompanying drawings:

Fig. 1 is a vertical middle section, with a part in elevation and with parts broken away, of a device embodying my invention in its preferred form.

Fig. 2 is a section on line 2—2 of Fig. 1.

Fig. 3 is a fragmentary vertical, middle section illustrating a modification.

Referring first to Figs. 1 and 2 of the drawings, the device there shown comprises a section 10 of drill pipe adapted to be interposed in a string of ordinary drill pipe sections such as the section 11, by means of the usual taper-thread couplings such as the coupling 12, but formed with slots 13, 13 through its wall, through which the space surrounding it in the well hole is in communication with an annular space within it defined by a substantially and resiliently stretchable hose 14.

The hose 14 is, at its upper and lower ends, spaced from and sealed to the inner face of the pipe section 10 by means of respective metal spacer rings 15, 15, which are press-fitted or otherwise secured in the ends of the pipe section and to which the hose is anchored and sealed as by vulcanized adhesion, the body of the hose being chiefly of rubber or the like.

The motive fluid is constrained to flow through the resiliently stretchable hose 14 and the slots 13 in the pipe section 10 permit the hose to expand in response to increases of internal pressure and thus to provide the cushioning effect.

As the hose is of substantially uniform internal cross-section and is open at both of its ends, it sustains the internal fluid pressure chiefly in cross-section, being subject to lengthwise strains only as a result of slight elongation of its wall incident to its enlargement in cross-section, and as a result of the small frictional drag of the current of fluid flowing through it.

Accordingly, if the pressures involved are of such magnitude as to make a reinforcement of the hose desirable, reinforcing strands such as the cords 16, 16 and 17, 17 are preferably disposed at only a slight pitch or angle to the cross-section of the hose.

In order that the hose may have the necessary resilient stretchability and at the same time have high ultimate or bursting strength, the reinforcing elements 16, 17 preferably are cords having suitably high twist and corresponding stretchability.

The embodiment illustrated in Fig. 3 corresponds substantially to that of Figs. 1 and 2 except that the hose, 14a, is of all-rubber construction and a stamped-metal thimble 18 is mounted in the end of the hose and swaged outward to clamp the wall of the hose against the spacer ring 15. The thimble is formed with a radial flange 19 which overlies the end edge of the hose and is sealed to the spacer ring 15 as by welding at 20, to protect the hose from fluid pressure against its end edge tending to dislodge it from the spacer ring 15.

For good anchorage of the hose end the embracing surfaces of one or both of the metal members can be roughened as by outwardly denting the sheet-metal thimble as at 21, 21.

The device as described is incorporated at a low position in the "drill-string," close to the motor, for maximum effectiveness in cushioning or preventing water-hammer.

I claim:

1. A fluid conduit comprising a length of rigid pipe and a length of expansible hose coupled and sealed to each other at their adjacent ends in series, and rigid means connecting that end of the length of pipe with the other end of the length of hose, for holding it in fixed relation to the length of pipe.

2. A fluid conduit comprising a plurality of lengths of fluid-conducting tubing coupled and sealed one to another in series, one of the same being rigid and another being expansible and flexible, and rigid means for holding the two ends of the expansible and flexible length in fixed relation to each other and to the rigid length.

3. A fluid conduit comprising a plurality of lengths of fluid-conducting tubing coupled and sealed one to another in series, one of the same being rigid and another being expansible and flexible, and rigid means for holding the two ends of the expansible and flexible length in fixed relation to each other and to the rigid length, said rigid means being sealed to the expansible and flexible length at its end farthest from the rigid length and there formed for coupling the flexible length to another fluid-conducting member in series.

CLYDE E. BANNISTER.

REFERENCES CITED

The following references are of record in the file of this patent:

UNITED STATES PATENTS

| Number | Name | Date |
|---|---|---|
| 46,773 | Bevan | Mar. 14, 1865 |
| 1,059,370 | Johnson | Apr. 22, 1913 |
| 1,304,036 | Eshelby | May 20, 1919 |

FOREIGN PATENTS

| Number | Country | Date |
|---|---|---|
| 765,099 | France | Mar. 19, 1934 |
| 563,633 | France | Sept. 29, 1923 |
| 249,927 | Great Britain | Apr. 6, 1926 |